Jan. 17, 1967 C. W. WAGENHALS 3,299,218

MAGNETIC HEAD HAVING INTERNAL PRINTED CIRCUIT CONNECTION MEANS

Filed Oct. 30, 1961

INVENTOR.
CARL W. WAGENHALS

BY Arthur H. Swanson

ATTORNEY.

3,299,218
Patented Jan. 17, 1967

3,299,218

MAGNETIC HEAD HAVING INTERNAL PRINTED CIRCUIT CONNECTION MEANS

Carl W. Wagenhals, Silver Spring, Md., assignor to Honeywell, Inc., a corporation of Delaware Filed Oct. 30, 1961, Ser. No. 148,325
3 Claims. (Cl. 179—100.2)

This invention relates to recording devices. More specifically, the present invention relates to magnetic recording heads.

An object of the present invention is to provide an improved magnetic recording head.

Another object of the present invention is to provide an improved magnetic recording head having an internal printed circuit connection means.

A further object of the present invention is to provide an improved magnetic recording head having a separate internal and extenral structure.

A still further object of the present invention is to provide an improved magnetic recording head, as set forth herein, which has a simple construction.

In accomplishing these and other objects, there has been provided in accordance with the present invention, a magnetic recording head having an outer shell, an annular end cap arranged to mate with one end of the shell and a plurality of electrical connection terminals mounted at the other end. A magnetic core structure having a transverse gap at one end thereof and a magnetic coil arranged thereon in transducing relationship with a magnetic field in the core structure is supported within the shell. Means are provided within the shell for supporting the outside surface of the end of the core structure having the transverse gap thereacross within the space defined by the end cap and with the end of the core structure forming a smooth surface being with the end cap. This means includes a plurality of magnetic shields and non-magnetic spacers to fill the remaining space defined by the end cap. A printed circuit board is supported within the shell to provide electrical connections between the magnetic coil and the electrical connection terminals provided in the other end of the shell.

A better understanding of the present invention may be had from the following detailed description when read in connection with the accompanying drawings in which.

Figures 1, 2, 3:
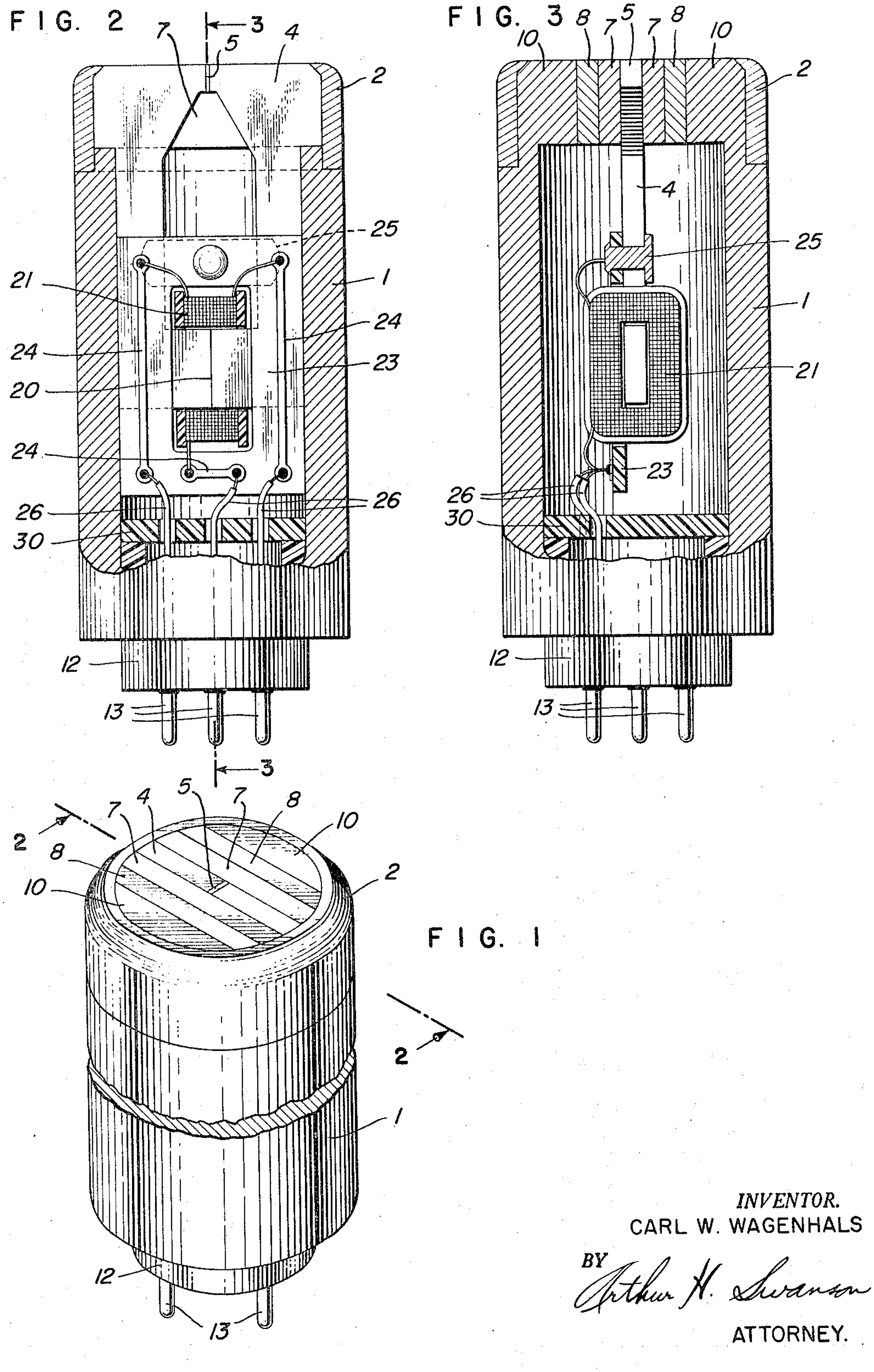
FIG. 1 is a pictorial representation of a magnetic recording head embodying the present invention.
FIG. 2 is a cross-section of FIG. 1 taken along line 2—2.
FIG. 3 is a cross-section of FIG. 1 taken along line 3—3.

Referring to FIG. 1 in more detail there is shown a magnetic recording head having a cylindrical outer shell 1. The shell 1 is arranged with an annular end cap 2 mounted on one end thereof. Positioned within the space defined by the annular end cap 2 is a magnetic core structure 4 having a gap 5 therein. A first pair of non-magnetic spacers 7 is supported within the aforesaid space with one spacer on each side of the core 4. A first pair of magnetic shields 8 is positioned with one adjacent to each of the spacers 7, and a second pair of non-magnetic spacing elements 10 is used to fill the remaining space within the annular extensions of the shell 1 and end cap 2. The core 4, the shields 8, and the spacers 7 and 10 are dimensioned to form a continuous smooth surface across the confines of the end cap 2 and flush with an outside face of the end cap 2 to define one end of the magnetic head.

The other end of the magnetic head has an electrical connection plug 12 extending therefrom with a plurality of metallic pins 13 arranged to provide electrical connections for the magnetic head.

Referring to FIG. 2, there is shown a cross-sectional view of FIG. 1 taken along line 2—2. It may be seen that the magnetic core 4 is arranged as a pair of generally C-shaped members which are supported within the cylindrical cavity formed by the shell 1. The C-shaped core members are positioned with the ends of the legs of the C of one core member mating with the ends of the legs of the other core member to form a generally rectangularly-shaped core structure. The two junctions of the mating surfaces of the C-shaped core members are disposed with a first junction forming the gap 5 and the second junction 20 being located within the shell 1. A magnetic coil 21 is wound on a portion of the core members within the shell 1 to envelope the second junction 20.

A printed circuit board 23 having printed electrical wiring 24 on a first side thereof is positioned within the shell 1 with an intimate contact between the core 4 and a second non-printed side of the board 23. A non-magnetic clamp means 25 is used to fasten the board 23 to the core 4. It is to be noted that the board 23 is arranged to allow clearance for the coil 21 on the core 4. The fine wire connections to the coil 21 are individually attached to different segments of the printed wiring 24 on the board 23. A plurality of individual wires 26 are also attached to the printed wiring 24 as individual electrical connections between the wiring 24 and the pins 13 in the plug 12. The printed wires 24 are, thus used to electrically bridge the gap between the fine wires from the core 21 and the pins 13 and to provide strong mechanical connections therebetween. Thus, the printed circuit board is effective to isolate any mechanical strain transmitted by the pins 13 from affecting the fine wires of the coil 21 and to provide a means for connecting the pins 13 without disturbing the coil 21. A support disc 30 is positioned between the board 23 and the plug 12 to provide a rigid support for the connecting wires 26.

What is claimed is:

1. A magnetic head comprising a magnetic core structure having a gap therein formed by a non-magnetic spacer, a magnetic coil on said core structure in a transducing relationship with said core structure, a hollow cylindrical shell having an internal diameter and a first and a second end, said shell being arranged to support said core structure and said coil therein with said gap at said first end of said shell, an annular end cap for said shell, said end cap being supported on said first end, magnetic shields supported within the space defined by the end cap on both sides of said core structure, non-magnetic spacers also supported within the space defined by the end cap, said core structure, said shields, and said spacers being arranged to form a smooth surface with said end cap across said first end of said shell, a printed circuit board arranged in closely fitting relationship within said internal diameter of said cylindrical shell, means for retaining said board within said shell, said board having printed wiring thereon corresponding to desired electrical connections for said coil, first means electrically connecting said printed circuit board to said coil, magnetic head connections means, said connections means being mounted in said second end of said shell, and second means electrically connecting said printed circuit board to said connection means whereby said printed wiring on said board is effective to provide a signal path between said first and said second means and said printed circuit board is further effective to isolate forces associated with said second means from said first means.

2. A magnetic head comprising a magnetic core structure, a magnetic coil on said core structure in a transducing relationship with said core structure, shell means being internally relieved for supporting said core structure therein, a printed circuit board arranged in closely fitting relationship within said internally relieved shell means, means for retaining said board on said core structure, said board having printed wiring thereon corresponding to desired electrical connections for said coil, first means electrically connecting said coil to said printed wiring on said board, and second means electrically connecting said printed wiring on said board to an external source, whereby forces associated with said second means are isolated from said first means.

3. A magnetic head comprising a magnetic core structure, a magnetic coil on said core structure in a transducing relationship with said core structure, a hollow cylindrical shell having an internal diameter for mechanically supporting said coil and core structure therein, a printed circuit board arranged in closely fitting relationship within the internal diameter of said cylindrical shell, means for retaining said board on said core structure, said board having printed wiring thereon corresponding to desired electrical connections for said coil, first wire means electrically connecting said coil to said printed wiring on said board, and second wire means electrically connecting said printed wiring on said board to a source external from said shell, whereby forces associated with said second wire means are isolated from said first wire means.

References Cited by the Examiner

UNITED STATES PATENTS

| | | | |
|---|---|---|---|
| 2,790,966 | 4/1957 | Mabbon et al. ----- | 179—100.2 |
| 2,905,933 | 9/1959 | Canepa ----------- | 179—100.2 |
| 2,910,544 | 10/1959 | McNutt ---------- | 340—174.1 |
| 2,943,384 | 7/1960 | Wisnor ----------- | 179—100.2 |
| 3,026,379 | 3/1962 | Carpenter -------- | 179—100.2 |

BERNARD KONICK, *Primary Examiner.*

J. R. GOUDEAU, V. P. CANNEY, *Assistant Examiners.*